(12) United States Patent
Chen et al.

(10) Patent No.: US 6,292,201 B1
(45) Date of Patent: Sep. 18, 2001

(54) INTEGRATED CIRCUIT DEVICE HAVING A CORE CONTROLLER, A BUS BRIDGE, A GRAPHICAL CONTROLLER AND A UNIFIED MEMORY CONTROL UNIT BUILT THEREIN FOR USE IN A COMPUTER SYSTEM

(75) Inventors: Joseph Chen; Hung-Wen Chen; Michael Chen, all of Hsin-Chu (TW)

(73) Assignee: Silicon Integrated Systems Corporation, Hsin-Chu (TW)

( * ) Notice: Subject to any disclaimer, the term of this patent is extended or adjusted under 35 U.S.C. 154(b) by 0 days.

(21) Appl. No.: 09/199,478

(22) Filed: Nov. 25, 1998

(51) Int. Cl.[7] .................................................. G06F 15/76
(52) U.S. Cl. .......................... 345/519; 345/520; 345/542; 345/535; 710/126; 710/129
(58) Field of Search ..................................... 345/519, 520, 345/531, 532, 535, 541, 542; 710/126–129

(56) References Cited

U.S. PATENT DOCUMENTS

| | | | |
|---|---|---|---|
| 5,659,715 | * | 8/1997 | Wu et al. ............................. 711/170 |
| 5,748,968 | * | 5/1998 | Nally et al. .......................... 710/240 |
| 5,920,881 | * | 7/1999 | Porterfield .............................. 711/2 |
| 6,052,133 | * | 4/2000 | Kang .................................. 345/521 |

* cited by examiner

Primary Examiner—Kee M. Tung
(74) Attorney, Agent, or Firm—Foley & Lardner

(57) ABSTRACT

An integrated circuit device is adapted for use in a computer system that includes a processing unit, a host bus connected to the processing unit, an input/output bus, a peripheral device connected to the input/output bus, a monitor, and a system memory. The integrated circuit device includes a core controller adapted to be connected to the host bus, a bus bridge connected to the core controller and adapted to be connected to the input/output bus, a graphical controller connected to the core controller and the bus bridge and adapted to be connected to the monitor, and a unified memory control unit connected to the core controller and the graphical controller and adapted to be connected to the system memory.

7 Claims, 7 Drawing Sheets

INTEGRATED CIRCUIT DEVICE HAVING A CORE CONTROLLER, A BUS BRIDGE, A GRAPHICAL CONTROLLER AND A UNIFIED MEMORY CONTROL UNIT BUILT THEREIN FOR USE IN A COMPUTER SYSTEM

BACKGROUND OF THE INVENTION

1. Field of the Invention

The invention relates to an integrated circuit device for use in a computer system, more particularly to an integrated circuit device that has a core controller, a bus bridge, a graphical controller and a unified memory control unit built therein.

2. Description of the Related Art

Referring to FIG. 1, a conventional personal computer system 1 is shown to comprise a central processing unit (CPU) 10, a host bus 11 connected to the CPU 10, a core logic 12 connected to the host bus 11, a memory bus 13 connected to the core logic 12, a system memory 14 connected to the memory bus 13, an input/output (I/O) bus 15 connected to the core logic 12, at least one peripheral device 16 connected to the I/O bus 15, an Advanced Graphical Port (AGP) bus 17 connected to the core logic 12, a stand-alone video graphic accelerator (VGA) card 18 connected to the AGP bus 17, and a monitor 19 connected to the VGA card 18. The VGA card 18 includes a VGA chip 181, a local frame buffer 182 formed from dynamic memory, and a flash memory 183 for VGA BIOS.

Referring to FIG. 2, it has been proposed heretofore in another conventional personal computer system 2 to discard the stand-alone VGA card, and mount the VGA chip 281 and the local frame buffer 282 directly on the system board (not shown) to reduce costs and simplify manufacture of the system board.

Referring to FIG. 3, it has also been proposed heretofore in still another conventional personal computer system 3 to employ a unified memory architecture (UMA) in order to result in more cost savings by reducing the system board space and the components on the system board (not shown). As shown, the personal computer system 3 comprises a CPU 30, a host bus 31 connected to the CPU 30, a core logic 32 connected to the host bus 31, an I/O bus 35 connected to the core logic 32, at least one peripheral device 36 connected to the I/O bus 35, an AGP bus 37 connected to the core logic 32, a VGA chip 38 connected to the AGP bus 37, a shared system memory 34, and a wired-or memory bus 33 interconnecting the core logic 32, the VGA chip 38 and the shared system memory 34. Since the VGA chip 38 shares the system memory 34 with the core logic 32, the need to provide a dedicated local frame buffer for the VGA chip 38 is therefore obviated.

However, in order to enable the VGA chip 38 and the core logic 32 to share the system memory 34, some protocol must be introduced for the VGA chip 38 and the core logic 32 to follow. There is thus a need to incorporate additional pins and interface signals into the VGA chip 38 and the core logic 32 for protocol communication. Referring again to FIG. 3, the VGA chip 38 issues the MREQ# signal to inform the core logic 32 of its need to use the memory bus 33 for data transmission. After internal arbitration by the core logic 32, the core logic 32 releases the memory bus control to the VGA chip 38, and indicates the released state to the VGA chip 38 via the MGNT# signal. At this time, the memory access cycle of the VGA chip 38 can proceed as long as the MGNT# signal is driven to an active state by the core logic 32. The memory access cycle of the VGA chip 38 is terminated when the MGNT# signal becomes inactive, except in cases where the VGA chip 38 issues a high priority signal (not shown) to the core logic 32.

Furthermore, since there is a switching penalty whenever the memory bus control is switched from the core logic 32 to the VGA chip 38, and vice versa, the wired-or architecture of the memory bus 33 will downgrade the system performance. FIG. 4 shows detailed pin constructions of the memory control signals which are driven by the core logic 32 and the VGA chip 38 onto the memory bus 33 for data transmission. FIG. 5 shows the switching overhead that is incurred whenever the memory bus 33 is switched between the core logic 32 and the VGA chip 38. As illustrated, the time period T1 between activation of the MREQ# signal and activation of the MGNT# signal depends on whether or not the memory bus is idle and on the internal arbitration algorithm of the core logic 32. The length of the time period T2, i.e. the length of the MGNT# signal, depends on the VGA data transmission length and on the presence of a memory request from other master devices with a higher priority than the VGA chip 38. In time period T3, if there is a memory request from another master device with a higher priority, the core logic 32 will cease to assert the MGNT# signal to inform the VGA chip 38 to stop its data transmission by deactivating the MREQ# signal. Otherwise, the core logic 32 will only cease to assert the MGNT# signal after the VGA chip 38 has finished its data transmission and has inactivated the MREQ# signal.

Because the memory bus 33 has the wired-or architecture, when one of the core logic 32 and the VGA chip 38 assumes control of the memory bus 33, it becomes responsible for driving all control signals to the system memory 34 to ensure proper functioning of the latter. Whenever the control of the memory bus 33 is switched from one master to another, the original master of the memory bus 33 should drive all the control signals of the memory bus 33 to a high voltage level for at least one clock cycle, and subsequently float the memory bus 33 by deactivating the output (o/p) enable pins of the corresponding memory bus signals (see FIG. 4) to avoid bus contention. In this manner, at least four clock signals are wasted due to bus switching when the control of the memory bus 33 is switched from one master to another. Moreover, in order to meet timing requirements of the system memory 34, such as RAS# pre-charge time, both the core logic 32 and the VGA chip 38 must finish the RAS# pre-charge time before they switch the memory bus 33 and after they get control of the memory bus 33 in order to avoid compatibility issues in the event that the core logic 32 and the VGA chip 38 are made by different chip vendors.

It is also noted that the conventional personal computer system 3 involves overhead in translating data from one bus protocol to another bus protocol, i.e. the generation of data in the form of the destination bus protocol. Synchronization penalty is further incurred if the clock domain of the source bus is different from that of the destination bus.

Translating the host data destined for the VGA chip 38 in the conventional personal computer system 3 normally comprises three phases: the initiate phase, the translated phase, and the response phase. The initiate phase starts from the cycle request from a current host bus owner to the generation of an intermediate request. The translated phase starts from the intermediate request to the completion of the cycle on the destination bus. The response phase starts from the completion of the cycle by a response agent on the destination bus to the completion of the cycle on the originating bus. In most cases, the initiate phase on the originating bus and the response phase on the destination bus perform at different clock domains. In the conventional personal computer system 3 of FIG. 3, the initiate phase is performed on the 100 MHZ X86-like host bus 31, while the response phase is performed on the 66 MHz AGP bus 37.

Therefore, in the event of an incoming transaction to the AGP bus 37, synchronization must be performed before entering the translated phase owing to communication between the two different clock domains. FIG. 6 illustrates a synchronizer 39 for performing the aforesaid synchronizing function. The synchronizer 39 is separated into an input stage 391 and an output stage 392. The input signal at the input stage 391 is sampled using an input clock. The output signal of the input stage 391 serves as an input to the output stage 392, and is sampled using an output clock. The penalty of the synchronization process depends on the skew between the input and output clocks. As shown in FIG. 7, if the rising edge of the output clock is near the rising edge of the input clock, less penalty is paid for the synchronization process, as indicated by the output signal (A) in FIG. 7. Otherwise, if the rising edge of the output clock is far from the rising edge of the input clock, more penalty is paid for the synchronization process, as indicated by the output signal (B) in FIG. 7.

Upon entering the translated phase for an AGP bus transaction after the synchronization process, the VGA chip 38 accepts the transaction and drives the response. Before entering the response phase, the communicating signal must be synchronized owing to communication between the two different clock domains. This synchronization process is the same as that between the initiate and translated phases, the main difference residing in the switching of the definitions of the input and output clocks.

SUMMARY OF THE INVENTION

Therefore, the object of the present invention is to provide an integrated circuit device for use in a personal computer system so as to overcome the aforesaid drawbacks that are commonly associated with the conventional personal computer systems.

More particularly, the main object of the present invention is to provide an integrated circuit device that has a core controller, a bus bridge, a graphical controller and a unified memory control unit built therein, whereby not only is the system cost reduced, but the need for a wired-or logic connection between the memory control unit and the system memory can be eliminated as well so as to eliminate the penalty paid in switching from the system memory controller to the display memory controller, and vice versa, for optimum graphical performance.

Another object of the present invention is to provide an integrated circuit device of the aforementioned type which includes separate internal buses that interconnect the core controller, the bus bridge, the graphical controller, and the unified memory control unit and that are operable concurrently, whereby the synchronization overhead that is commonly encountered when translating data from one bus protocol to another bus protocol can be eliminated to enhance the performance of a personal computer system.

According to this invention, an integrated circuit device is adapted for use in a computer system that includes a processing unit, a host bus connected to the processing unit, an input/output bus, a peripheral device connected to the input/output bus, a monitor, and a system memory. The integrated circuit device comprises a core controller adapted to be connected to the host bus, a bus bridge connected to the core controller and adapted to be connected to the input/ output bus, a graphical controller connected to the core controller and the bus bridge and adapted to be connected to the monitor, and a unified memory control unit connected to the core controller and the graphical controller and adapted to be connected to the system memory. The core controller, the bus bridge, the graphical controller and the unified memory control unit are built into a single integrated circuit package.

In the preferred embodiment, the unified memory control unit includes a graphical-memory address/data path connected to the graphical controller, a system-memory address/ data path connected to the core controller, a centralized memory arbiter connected to the core controller and the graphical controller so as to detect a respective memory request signal therefrom, and a unified memory controller adapted to be connected to the system memory and connected to the graphical -memory and system-memory address/data paths, the unified memory controller being further connected to and controlled by the memory arbiter so as to be adapted to allocate access of the system memory to one of the graphical controller and the core controller via a corresponding one of the address/data paths in accordance with status of the memory request signals received by the memory arbiter.

Preferably, three separate and concurrently operable internal buses connect the graphical controller and a respective one of the core controller, the bus bridge and the unified memory control unit. The internal buses run at the same clock domain as the host bus.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 8:
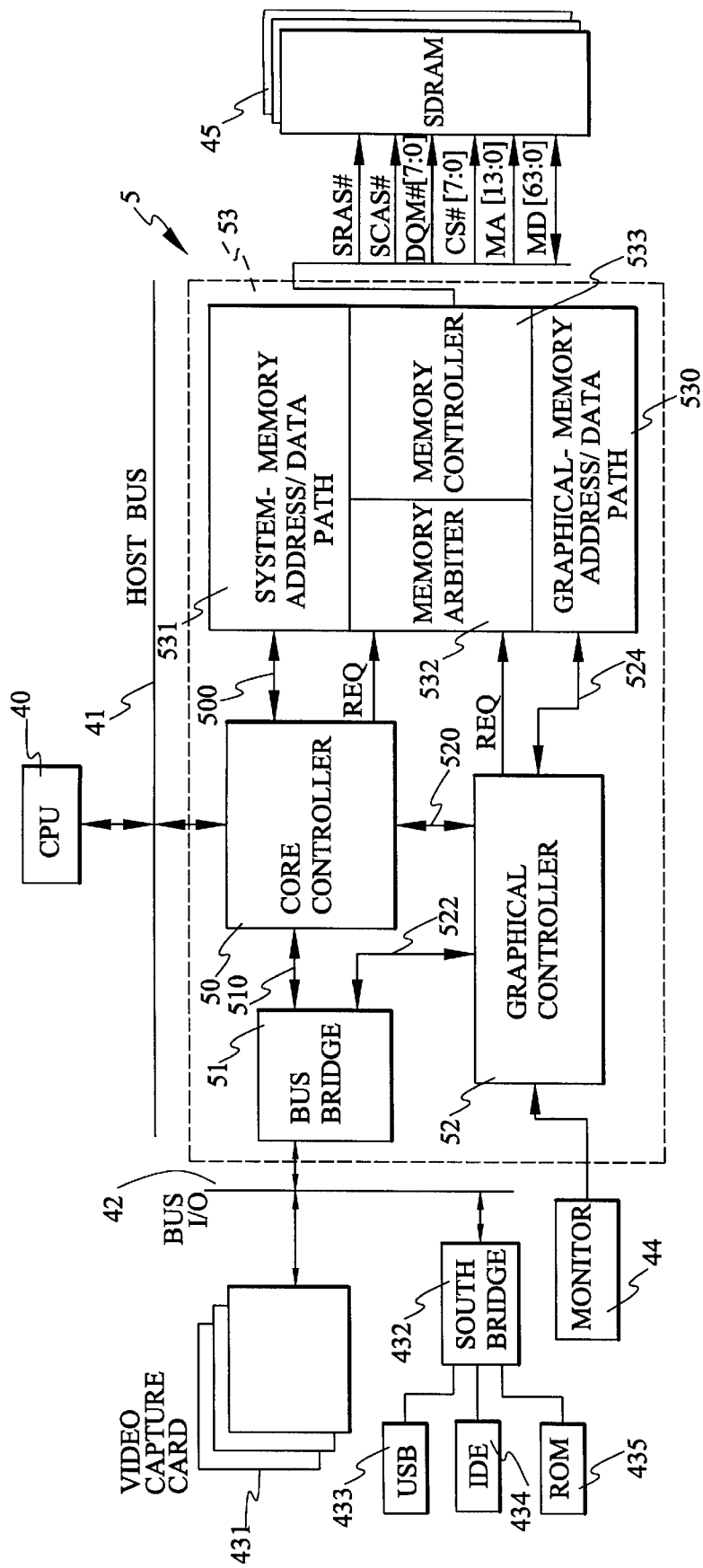
FIG. 8 is a schematic circuit block diagram of the preferred embodiment of an integrated circuit device for use in a personal computer system in accordance with the present invention.

Referring to FIG. 8, the preferred embodiment of an integrated circuit device 5 according to the present invention is shown to be adapted for use in a personal computer system that comprises a CPU 40, a host bus 41 connected to the CPU 40, an input/output (I/O) bus 42, peripheral devices connected to the I/O bus 42, a monitor 44, and a system memory 45. The peripheral devices include a video capture card 431 and a south bridge 432 connected to a USB port device 433, a hard disk drive (IDE) 434, and a read-only memory (ROM) 435 for system BIOS and VGA BIOS. The integrated circuit device 5 includes a core controller 50, a bus bridge 51, a graphical controller 52 and a unified memory control unit 53 that are built into a single integrated circuit package.

The core controller 50 is adapted to be connected to the host bus 41, and functions as a host bus interface, a host command queue, and a read/post-write first-in first-out (FIFO) memory.

The bus bridge 51 is adapted to be connected to the I/O bus 42, and is interfaced to the core controller 50 via a first internal bus 510, thereby permitting transmission of data from the host bus 41 to the I/O bus 42, and vice versa.

The graphical controller 52 is adapted to be connected to the monitor 44, and functions as a graphical command queue, a graphical engine, a read-ahead/post-write FIFO memory, a cathode ray tube (CRT) FIFO memory, a texture cache and a CRT controller. A second internal bus 520 interfaces the graphical controller 52 and the core controller 50, and is responsible for transferring configuration data, I/O data, command data, and frame buffer data from the core controller 50 to the graphical controller 52, and vice versa. The destination of the configuration data, the I/O data, and the command data are normally to and from a FIFO memory in the graphical controller 52. The destination of the frame buffer data is the part of the system memory 45 that is allocated as the display memory. However, the frame buffer data is normally temporarily stored in the write FIFO memory or read FIFO memory of the graphical controller 52 before being sent to the system memory 45 or forwarded to the second internal bus 520.

In the preferred embodiment, a third internal bus 522 interfaces the graphical controller 52 and the bus bridge 51. Video data from the I/O bus 42 is written into the system memory 45 via the bus bridge 51, the third internal bus 522 and the graphical controller 52. Normally, the video data is written temporarily in the FIFO memory of the graphical controller 52 before being sent to the system memory 45.

The unified memory control unit 53 includes a graphical-memory address/data path 530 interfaced to the graphical controller 52 via a fourth internal bus 524, a system-memory address/data path 531 interfaced to the core controller 50 via a fifth internal bus 500, a centralized memory arbiter 532 connected to the core controller 50 and the graphical controller 52 so as to detect a respective memory request signal (REQ) therefrom, and a unified memory controller 533 adapted to be connected to the system memory 45. The unified memory controller 533 is further connected to the graphical-memory and system-memory address/data paths 530, 531, and to the memory arbiter 532. According to the status of the memory request signals (REQ) received by the memory arbiter 532, the memory controller 533 is controlled by the memory arbiter 532 so as to be adapted to allocate access of the system memory 45 to one of the graphical controller 52 and the core controller 50 via a corresponding one of the address/data paths 530, 531.

For instance, when the graphical controller 52 processes commands that are queued therein, memory access requests are generated to the memory arbiter 532 to retrieve data from the system memory 45 or to write data into the system memory 45. Data transfer, inclusive of periodic screen refresh data, computed graphical data, and frame buffer data, between the graphical controller 52 and the unified memory control unit 53 is accomplished via the fourth internal bus 524. The fourth internal bus 524 is also used to transfer texture data stored in the system memory 45 to the texture cache of the graphical controller 52.

Figure 1:
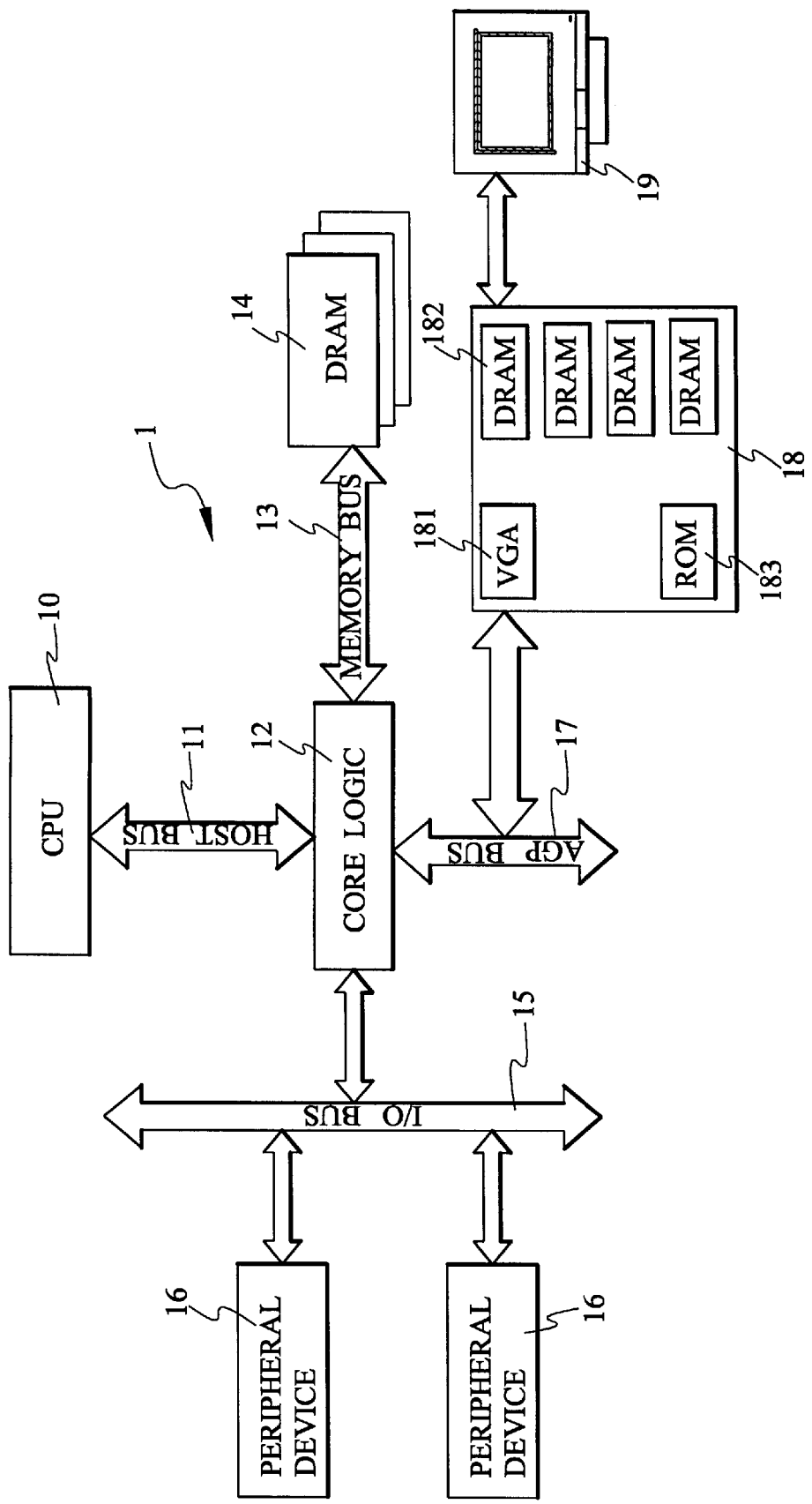
FIG. 1 is a schematic circuit block diagram of a conventional personal computer system that incorporates a stand-alone VGA card.
Figure 2:
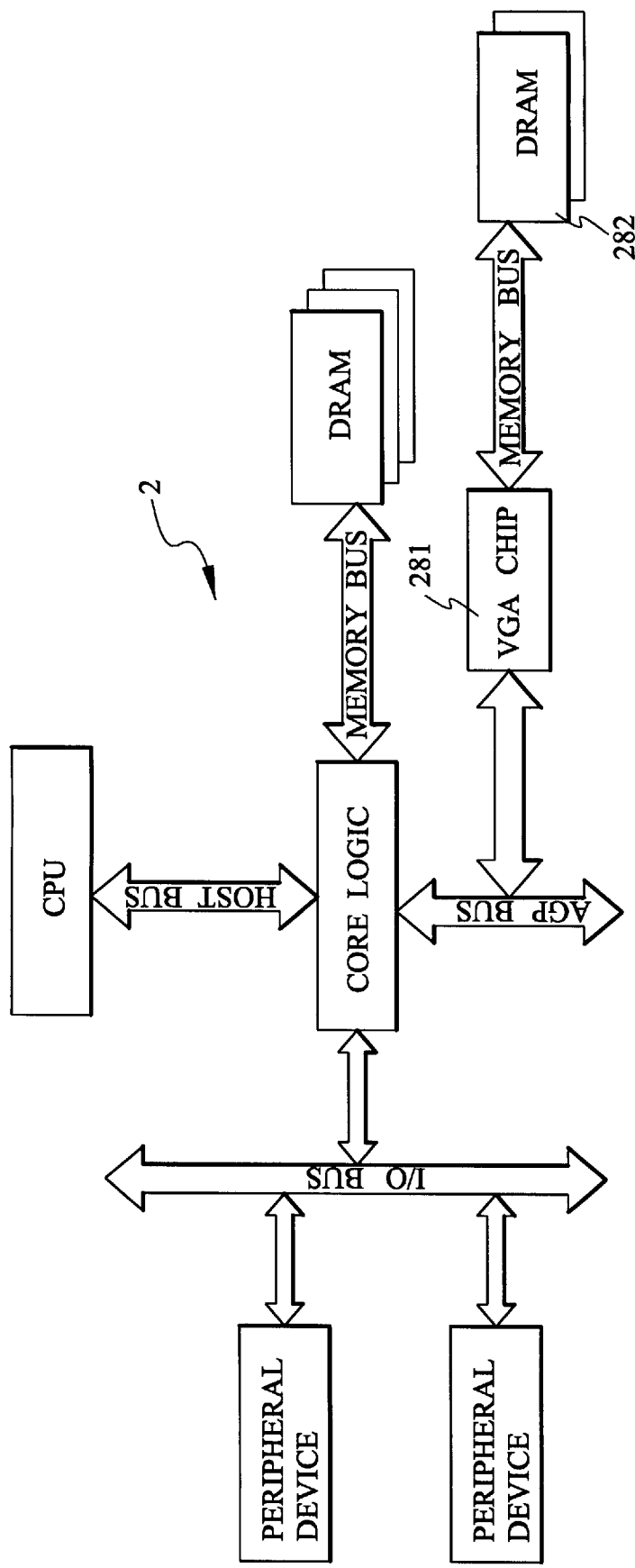
FIG. 2 is a schematic circuit block diagram of another conventional personal computer system that has a VGA chip and a local frame buffer mounted directly on a system board.
Figure 3:
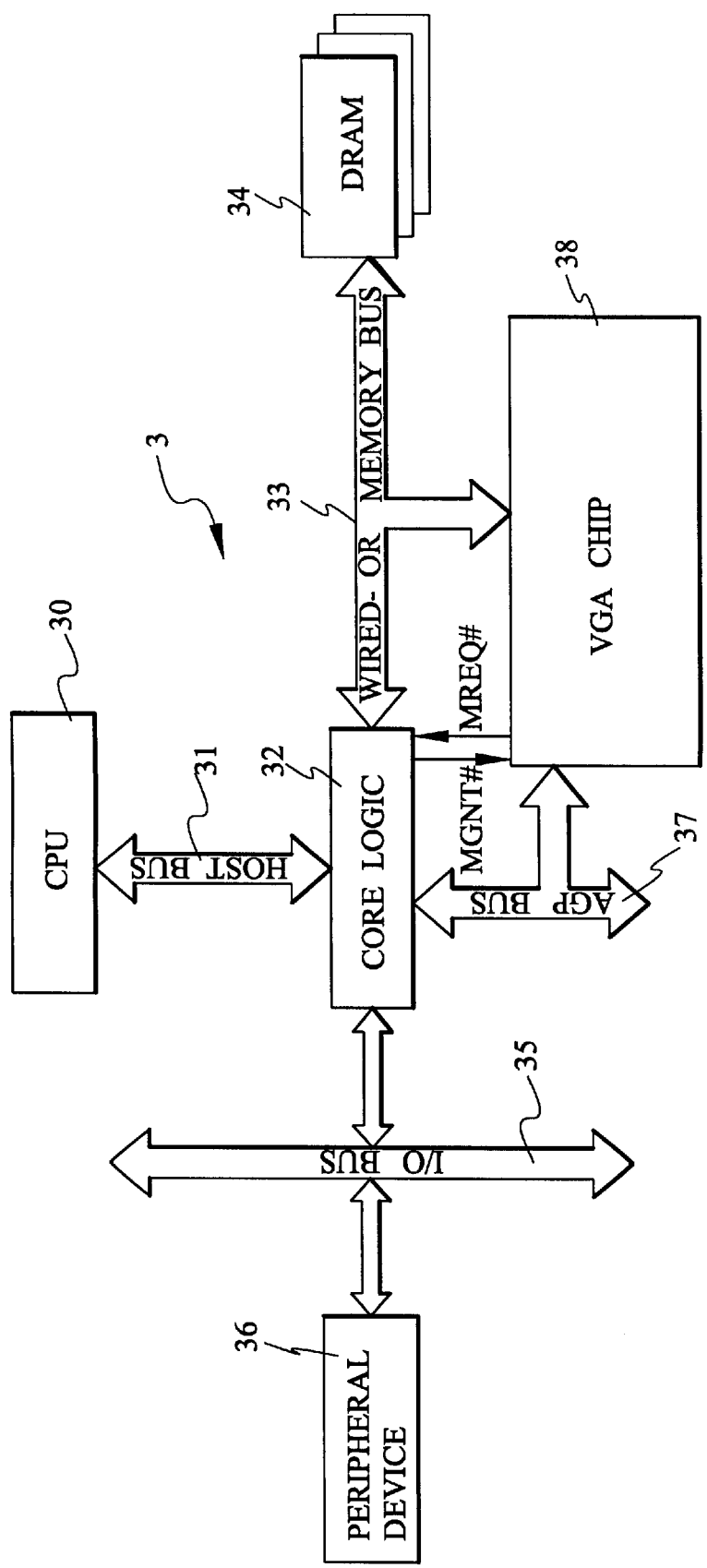
FIG. 3 is a schematic circuit block diagram of still another conventional personal computer system that has a core logic and a VGA chip connected to a shared system memory via a wired-or memory bus.
Figure 4:
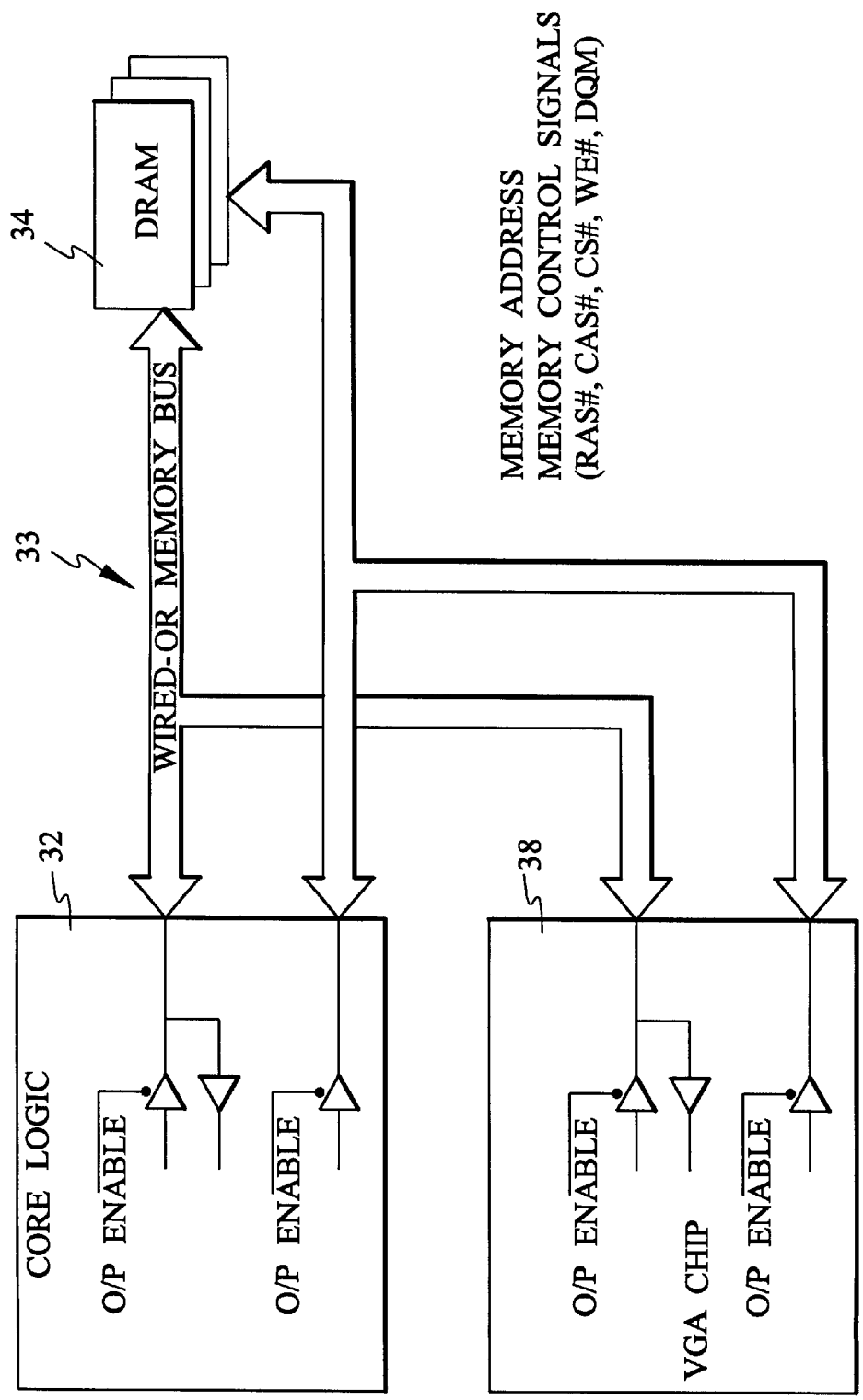
FIG. 4 shows detailed pin constructions of the memory control signals which are driven by the core logic and the VGA chip of the conventional personal computer system of FIG. 3 onto the wired-or memory bus for data transmission.
Figure 5:
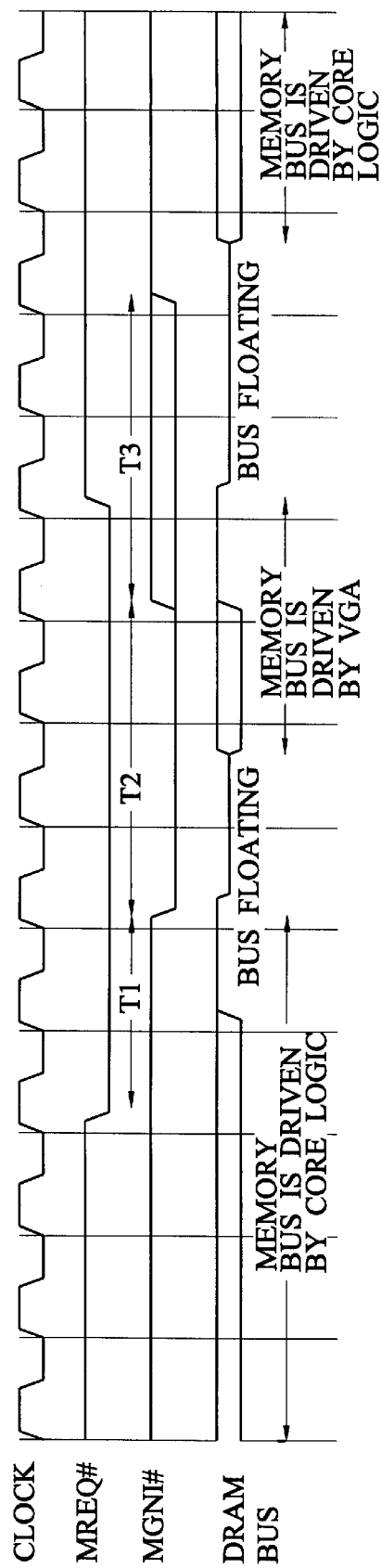
FIG. 5 shows the switching overhead that is incurred whenever the wired-or memory bus is switched between the core logic and the VGA chip in the conventional personal computer system of FIG. 3.
Figure 7:
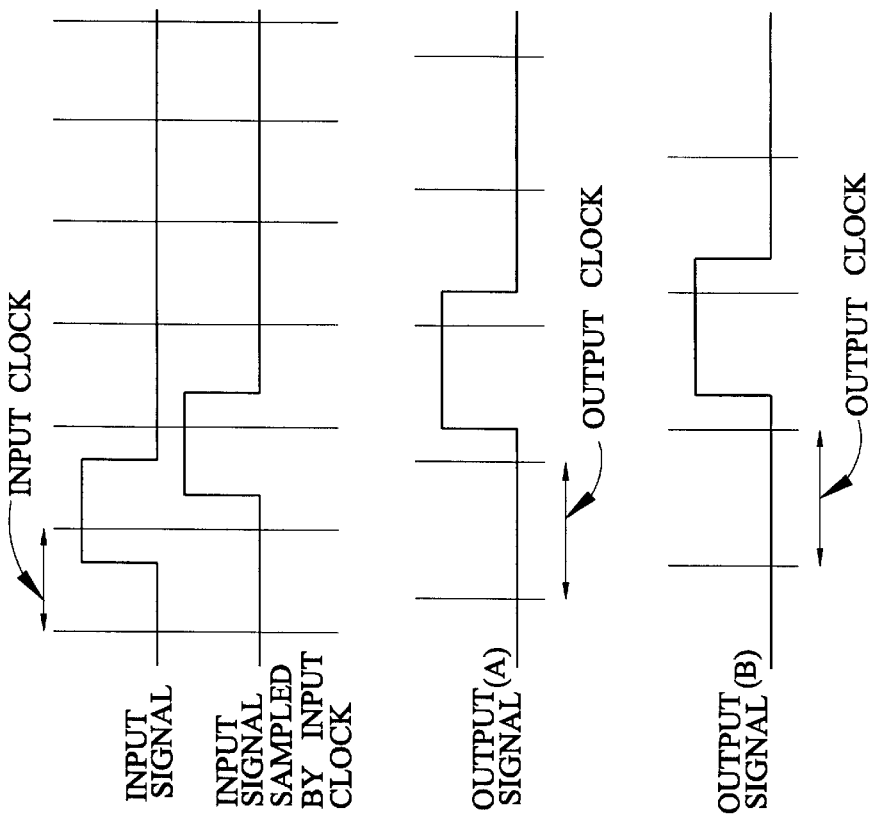
FIG. 7 illustrates the penalty that is introduced by the synchronizer of FIG. 6.
Figure 6:
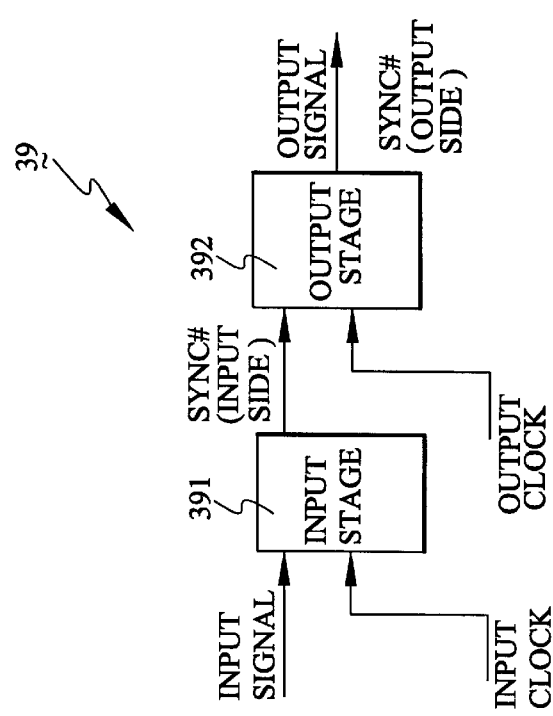
FIG. 6 illustrates a synchronizer that is employed in the conventional personal computer system of FIG. 3.

Since the internal buses 510, 520, 522, 524, 500 are separate, data transactions on these internal buses can be performed simultaneously for multiple data transaction. For instance, command data can be performed in the second internal bus 520 simultaneous with the transfer of texture data in the fourth internal bus 524. This is in contrast with the conventional personal computer system 3 shown in FIG. 3, where the command data and the texture data cannot be performed simultaneously through the single AGP bus 37. Moreover, command data can be performed in the second internal bus 520 simultaneous with the transfer of video data in the third internal bus 522. In the conventional personal computer system 3 of FIG. 3, video data from the I/O bus 35 can only be transferred to the system memory 34 through the AGP bus 37, thereby impeding concurrent operation of command data and video data.

Furthermore, almost no overhead is paid in translating data from one bus protocol to another bus protocol in the integrated circuit device 5 of the present invention since the graphical controller 52 is connected to each source or destination bus via the internal buses 520, 522, 524, thereby obviating the need to translate the data that originates on the source bus to the bus protocol in the destination bus. In the instance of data from the host bus 41 to the graphical controller 52, only the intermediate replica of the data is generated at the internal bus 520 to minimize the overhead. Note that the clocks paid for generating the intermediate request from the host bus 41 to the internal bus 520, and vice versa, are the only overhead incurred. However, these clocks are generated naturally due to interfacing of the host bus 41 and the graphical controller 52. By running the internal buses 510, 520, 522, 524, 500 at the same clock domain as the source bus, such as the host bus 41, the need for a synchronization process in the initiate phase and the response phase of the graphical controller 52 can be completely eliminated. Upon comparing with the conventional personal computer system 3 of FIG. 3, the total number of clocks spent in the initiate and response phase by the integrated circuit device 5 is the same, but the number of clocks spent in the translated phase is tremendously reduced in the integrated circuit device 5 of this invention because the synchronization process and the data translation process have been eliminated.

In other words, the integrated circuit device 5 of the present invention increases the data throughput from the source bus to the destination bus because time is spent in forwarding data between the two buses instead of translating the data between the two buses.

It has thus been shown that the integrated circuit device 5 of this invention offers the benefit of lower system cost because the number of pins that are in use is dramatically reduced. Moreover, since the need for a wired-or logic connection between the integrated circuit device 5 and the system memory 45 has been eliminated with the provision of the unified memory control unit 53, the penalty paid in switching from a system memory controller to a display memory controller, and vice versa, is eliminated to improve the overall system performance. In addition, the synchronization overhead that is commonly encountered when translating data from one bus protocol to another bus protocol can be eliminated to further enhance the performance of the personal computer system that incorporates the integrated circuit device 5 of the present invention. The objects of the present invention are thus achieved.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An integrated circuit device for use in a computer system that includes a processing unit, a host bus connected to the processing unit, an input/output bus, a peripheral device connected to the input/output bus, a monitor, and a system memory, said integrated circuit device comprising:

a core controller adapted to be connected to the host bus;

a bus bridge connected to said core controller and adapted to be connected to the input/output bus;

a graphical controller connected to said core controller and said bus bridge and adapted to be connected to the monitor;

a unified memory control unit including: a graphical-memory address/data path connected to said graphical controller; a system-memory address/data path connected to said core controller; a centralized memory arbiter connected to said core controller and said graphical controller so as to detect a respective memory request signal therefrom; and a unified memory controller adapted to be connected to the system memory and connected to said graphical-memory and system-memory address/data paths, said unified memory controller being further connected to and controlled by said memory arbiter so as to be adapted to allocate access of the system memory to one of said graphical controller and said core controller via a corresponding one of said address/data paths in accordance with status of the memory request signals received by said memory arbiter; and three separate and concurrently operable internal buses that connect said graphical controller and a respective one of said core controller, said bus bridge and said unified memory control unit.

2. The integrated circuit device as claimed in claim 1, wherein said core controller, said bus bridge, said graphical controller and said unified memory control unit are built into a single integrated circuit package.

3. The integrated circuit device as claimed in claim 1, wherein said internal buses run at the same clock domain as the host bus.

4. An integrated circuit device for use in a computer system that includes a processing unit, a host bus connected to the processing unit, an input/output bus, a peripheral device connected to the input/output bus, a monitor, and a system memory, said integrated circuit device comprising:

a core controller adapted to be connected to the host bus;

a bus bridge connected to said core controller and adapted to be connected to the input/output bus;

a graphical controller connected to said core controller and said bus bridge and adapted to be connected to the monitor;

a unified memory control unit including: a graphical-memory address/data path connected to said graphical controller; a system-memory address/data path connected to said core controller; a centralized memory arbiter connected to said core controller and said graphical controller so as to detect a respective memory request signal therefrom; and a unified memory controller adapted to be connected to the system memory and connected to said graphical-memory and system-memory address/data paths, said unified memory controller being further connected to and controlled by said memory arbiter so as to be adapted to allocate access of the system memory to one of said graphical controller and said core controller via a corresponding one of said address/data paths in accordance with status of the memory request signals received by said memory arbiter;

a first internal bus that interfaces said core controller and said bus bridge;

a second internal bus that interfaces said graphical controller and said core controller;

a third internal bus that interfaces said graphical controller and said bus bridge;

a fourth internal bus that interfaces said graphical controller and said unified memory control unit; and a fifth internal bus that interfaces said core controller and said unified memory control unit.

5. The integrated circuit device as claimed in claim 4, wherein said first, second, third, fourth and fifth internal buses are separate from each other and are operable concurrently.

6. The integrated circuit device as claimed in claim 4, wherein said first, second, third, fourth and fifth internal buses run at the same clock domain as the host bus.

7. The integrated circuit device as claimed in claim 4, wherein said core controller, said bus bridge, said graphical controller and said unified memory control unit are built into a single integrated circuit package.

* * * * *